Oct. 25, 1949. H. C. LITTLE Re. 23,158
POT TYPE OIL BURNER
Original Filed Aug. 14, 1943 2 Sheets-Sheet 1
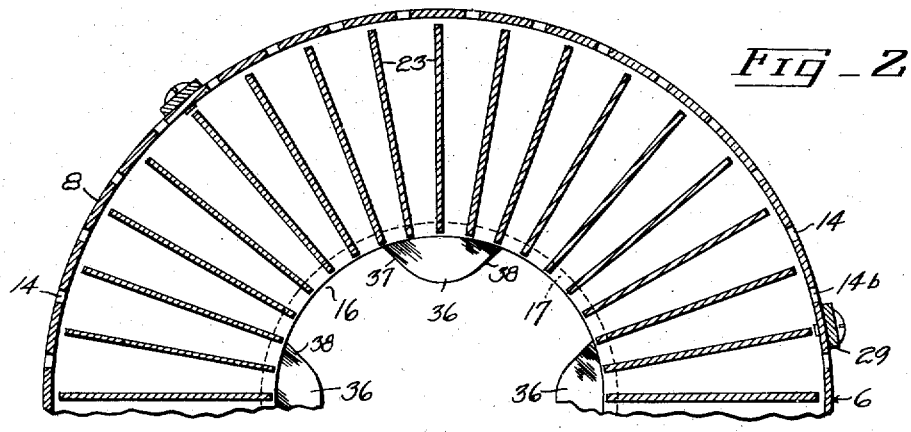
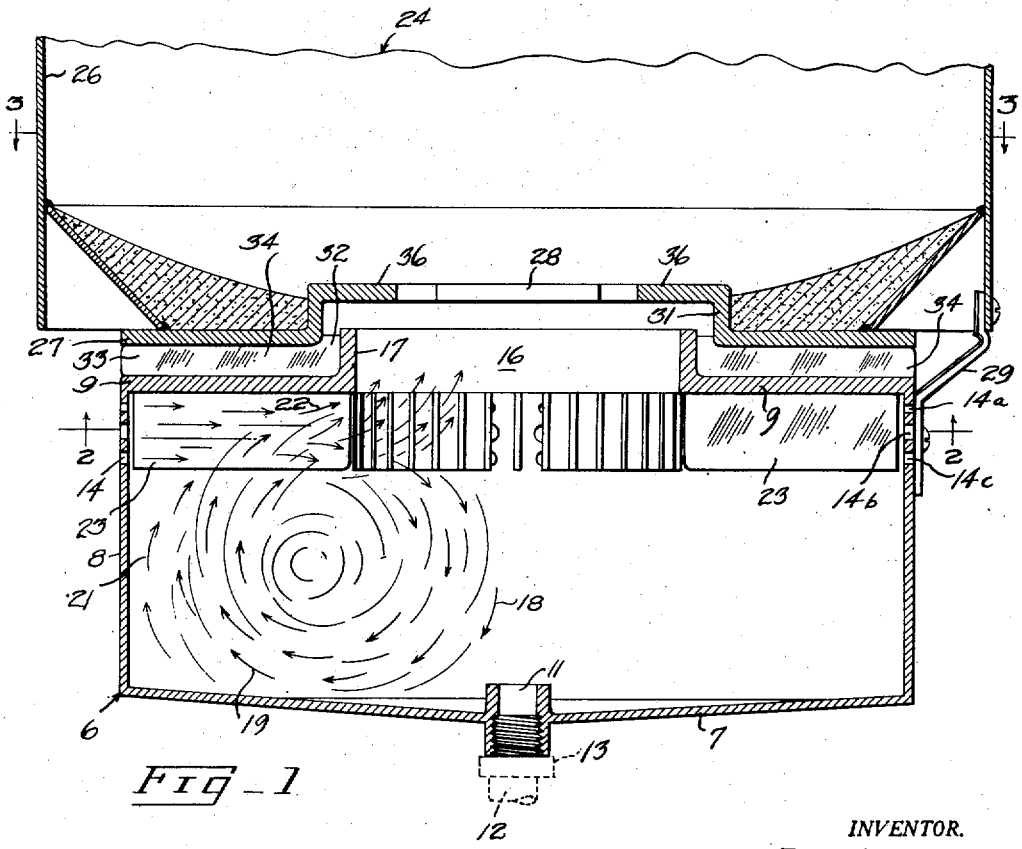
INVENTOR.
HARRY C. LITTLE
BY Gardner & Warren
his attys.

Oct. 25, 1949. H. C. LITTLE Re. 23,158

POT TYPE OIL BURNER

Original Filed Aug. 14, 1943 2 Sheets-Sheet 2

INVENTOR.
HARRY C LITTLE
BY Gardner & Warner
attys.

Reissued Oct. 25, 1949

Re. 23,158

UNITED STATES PATENT OFFICE 23,158

POT TYPE OIL BURNER

Harry C. Little, San Rafael, Calif.

Original No. 2,401,086, dated May 28, 1946, Serial No. 498,652, August 14, 1943. Application for reissue May 26, 1947, Serial No. 750,428

11 Claims. (Cl. 158—91)

The invention relates to oil burners and more particularly to that type of oil burner wherein fuel oil is introduced into a carburator chamber and therein vaporized by heat, and mixed with air to proper combustion mixture and discharged for burning.

An object of the invention is to provide an oil burner of the character described affording improved heat output capacity for the size of the burner with clean, efficient burning conditions.

Another object of the invention is to provide an oil burner having quick starting and rapid oil vapor generating characteristics.

Still another object of the invention is to provide an oil burner which has an improved rapid response to changes in rates of oil input in changing from high to low fire and vice versa and which becomes quickly extinguished upon cutting off of the oil intake so as to reduce to a minimum the undesirable, low, sporadic, and uncontrolled burning usually occurring in a burner of the present type when the oil flow to the burner is turned off.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a vertical longitudinal sectional view taken through a burner embodying my invention.

Figure 2 is a transverse sectional view of the burner taken on the line 2—2 of Figure 1.

Figure 3:
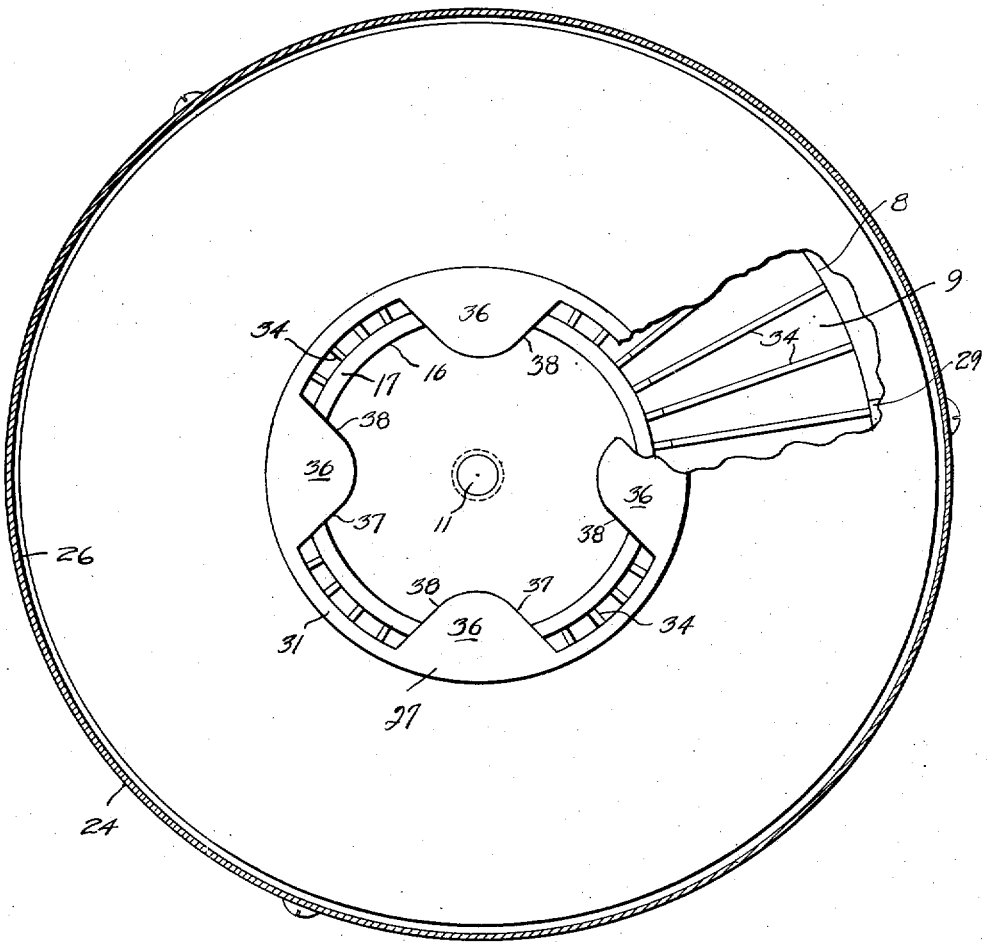
Figure 3 is a transverse sectional view taken through the vaporizing chamber associated with the burner, the plane of the section being indicated by the line 3—3 of Figure 1.

The oil burner 6 as depicted in the accompanying drawings consists of a container preferably of cylindrical shape defined by a bottom wall 7, a cylindrical side wall 8, and a top wall 9. Provided preferably in the bottom wall 7 and desirably centrally thereof, is an oil inlet opening 11 to which an oil delivery pipe 12 is to be connected by means of a fitting 13. Air inlet means, here in the form of a plurality of openings 14 in the side wall 8, is provided for admitting air into the chamber for mixing with oil vapor formed therein preparatory to burning. Formed in the top wall 9 substantially centrally thereof is a discharge opening 16, here bounded by an upstanding flange or tube 17. The bottom wall 7 is preferably slightly dished to cause the oil to gather or puddle around the central portion of the bottom directly under the discharge opening 16.

Oil entering upon the bottom wall of the container is vaporized by reason of the heat to which the bottom of the burner is subjected, and the generated vapor is admixed with air entering the container through the openings 14 so as to provide a burnable mixture of air and oil vapor. As an important feature of the present invention, the burner is so designed and constructed as to set up within the container a circulation of the air and the oil vapor causing the latter to move downwardly through the central portion of the container as indicated by flow arrows 18, outwardly across the bottom of the container as indicated by flow arrows 19, upwardly along the side walls of the container as indicated by flow arrows 21, and thence inwardly across the under side of the top wall 9 as indicated by flow arrows 22. As will be noted from the drawings this circulation of air and oil vapor in toroidal convolutions, directs the hot gases downwardly towards the oil inlet opening 11 and across the bottom of the pot where the mixture is enriched by oil vapor after which the vapor and air undergo a considerable travel during which the air and vapor may become intimately mixed prior to passage out of the discharge opening 16. It is preferable in order to provide for a maximum capacity of the burner, that the circulation of the gas in the radially-directed toroidal convolutions aforesaid takes place throughout the entire chamber, and this is obtained in part by directing streams of air radially inward at the top of the chamber toward the throat, the velocity of such streams producing a low pressure area at the sides which sets up a flow thereto along the bottom of the chamber and which in turn sucks a portion of the top stream downwardly from under the throat to move therewith. A preferred arrangement is illustrated in the accompanying drawings and consists in the using of a plurality of radial vanes 23 on the under side of the top wall 9. These vanes are preferably formed integral with and depend from the top wall and are positioned in substantially radial planes with respect to the vertical center line of the burner and extend radially from adjacent the opening 16 to adjacent the side wall 8. As will be noted with reference to Figure 1 of the drawings, adjacent vanes 23 form with the top wall 9 a plurality of circumferentially-spaced radially extending inverted channels which increase in circumferential width towards their outer ends. Cooperating with the provision of the vanes is the positioning and concentration of the air openings 14 at the upper end of the wall 8 so as to direct the incoming air horizontally into the pot at the under side of the top wall 9 between the vanes 23. As will be seen from Figure 1 of the drawings a plurality of three openings 14*a*, 14*b*, and 14*c* are arranged in a substantially vertical line but all are within the vertical dimension of the channel. Preferably these openings at the outer ends of the channels are the only air inlet openings to the container so that the total air input to the container is located directly under the top wall 9 and within the confines of the channels. It is also important to note that this concentration and confinement of the openings at the top of the side wall 8 with the resultant low pressure produced thereat materially induces the upward flow of the vapor along the wall. Because of the radial pattern of the vanes and the resulting converging of the channels towards the center of the container, incoming air is guided in independent streams towards the center of the container where a portion of the air will be impressed with a downward component of movement as a part of the circulatory movement within the container as above described.

The vanes 23 also provide another very important function in absorbing heat from the air and oil vapor so as to restrain burning and facilitate mixing of the air and oil vapor in the channels. In the circulatory effect above described, a substantial portion of the incoming air is forced downwardly to pick up oil vapor along the bottom of the container and the air and oil vapor is induced as above explained to move up the side wall and back through the channels where a portion of the mixture is again deflected downwardly while another portion is drawn off from the circulating gases and into the discharge opening 16 by reason of the reduced stack pressure. Thus in operation the mass of air and oil vapor continues to circulate in the manner described gradually enriching the mass with oil vapor and passing off into the discharge opening for burning. Under normal operations some burning takes place in the container thus producing heat for vaporizing the oil and for accelerating the circulatory movement. Due however to the cooling effect of the vanes, little or no burning takes place within the channels. I have found that best results are obtained when three openings, rather than a lesser or greater number of openings, are used at the outer ends of the channels and when the center of the three openings, 14*b*, is made substantially larger than the upper and lower openings 14*a* and 14*c*. The arrangement of the air openings in the manner described appears to have a substantial effect on the desirable circulating effect within the burner. The entering air streams have an ejector action, driving the gases inwardly through the channels and at the same time drawing the gases upwardly as aforesaid along the side wall and into the channels. The lower row of air openings 14*c* provides primary air for premixing with the oil vapor. The middle row of openings, 14*b*, provide the main air jets as aforesaid and the air issuing therefrom supports the primary combustion within the container. The top row of openings 14*a* provide air streams which for the most part are confined to the underside of the top wall 9 and pass into the discharge opening 16 for supporting the main secondary combustion above the burner. One important advantage in confining the air inlet openings to the top of the side wall 8 is the provision of an imperforate container over substantially its full height, thus effectively avoiding the danger of an oil overflow from the container when the oil builds up from its usual depth on the bottom wall before the auxiliary automatic level control valve operates to shut off the oil flow.

Preferably and as herein illustrated means is provided for air cooling the top wall 9 of the burner so as to remove the heat absorbed by the vanes 23. When in the installation of the burner air is permitted to freely circulate around and across the top wall of the burner at the outer side thereof, this effect can be accomplished. In the present burner, however, a cooling of the top wall 9 of the burner is obtained by passing secondary air across the upper side of the top wall. As shown in Figure 1, the present burner is adapted for use with and is shown operatively connected to a heater casing 24 providing a combustion chamber and including, of the portion here shown, a side wall 26 and a bottom wall 27, the latter being here formed with a burner opening 28 for receiving the gases discharged from the burner. The burner may be secured in place under the heater casing with the discharge opening of the burner in registration with the burner opening of the casing, by any suitable means such as the mounting brackets 29 here shown connecting the burner with the casing. As will be seen from Figure 1, the burner is preferably supported with the top wall thereof spaced from the bottom wall 27 of the casing so as to define an air space therebetween. In the preferred embodiment of the invention as herein depicted, the opening 28 in the heater casing is bounded by an upstanding flange 31 of somewhat greater diameter than the flange 17 on the top of the burner so as to define therebetween an annular passage 32 which connects the passage 33 between the top wall 9 of the burner and the bottom wall 27 of the casing with the interior of the casing for supplying secondary air thereto. In order to improve the heat exchange relation within the passage 33, I prefer to mount on the upper side of the top wall 9 of the burner a plurality of radial fins or vanes 34 which assist in dissipating the heat from the top wall of the burner and also function to preheat the secondary air before the latter enters the combustion chamber.

As another improved feature of the present construction, flame concentration means is provided at the upper end of the burner throat. As here shown, this means consists of a plurality of overhanging portions 36 which are positioned in substantially 90° spaced relation around the top perimeter of the flange 31 and extend inwardly therefrom over the top of flange 17 so as to define a cross-shaped top opening for the burner throat. As will be best seen from Figure 3 the opposed edges 37 and 38 of adjacent overhanging portions 36 are formed in substantially parallel relation thus functioning to direct air and oil vapor issuing laterally from the under side of the portions 36 at such edges in opposite clashing streams producing intense and concentrated burning. The air passing over the inner side of flange 17 and across the underside of the overhanging portions 36 protects these members against a direct flame impingement and also constantly cools these parts to safe working temperatures.

It will be seen from the drawing that a material portion of the stream of air and fuel vapor mixture rising from the vaporizing chamber and passing through the discharge opening will, upon approaching the throat opening 28, impinge against the underside of the overhanging portions 36 and will be deflected thereby radially inwardly of and toward the axis of the flow thus somewhat compressing the flow and causing the deflected portions to be driven substantially toward the center thereof. It will be also noted that the secondary air enters the stream at a point below the burner throat and before the aforesaid radial deflection of the flow takes place. Thus the secondary air by entering the stream in a plurality of directions radially thereof serves, with the assistance of the overhanging portions 36 to completely intermix the fuel mixture and secondary air before the stream finally issues from the burner throat. Complete combustion of the fuel mixture is thereby assured and the fullest possible thermal output of the burner is thereby realized.

As will be seen from the drawings, the overhanging portions 36 while being of an area large enough to provide for substantial radial inward concentration of the flow of the mixture through the throat, the area of all the open space left between the portions is at least substantially equal to the combined area of the portions themselves. In this way, the advantages produced by the inclusion of the overhanging members will not impede the effective free flow of the rising column at and above the area at which the secondary air enters the throat.

The burner may be used as either a natural or forced draft type. When used as a natural draft burner, the reduced pressure in the stack (not shown) connected to the combustion casing 24, induces the circulation through the burner. The burner may, however, as is well known in the art, be operated under forced draft, with very substantially improved operation, by forcing the air through the openings 14 and the secondary air passage 34 by an elevated pressure. This may be accomplished by enclosing the burner or at least the air intake end of the air passages in a chamber or manifold connected to an air blower. In either case, whether natural or forced draft, the burner as herein described provides many important advantages over burners of this general type heretofore available. The burner starts readily on ignition of oil on the bottom thereof and rapidly generates sufficient vapor to quickly pass through the early stages of burning to full operation. Due to the toroidal circulatory action within the burner, a minimum quantity of oil is present within the burner during operation and hence the burner is more responsive to changes in oil input throughout all operating stages. Of particular advantage is the rapid extinguishment of the flame upon cutting off of the oil flow so as to reduce to a minimum the undesirable last minute, sporadic burning which usually occurs before the burner finally goes out. The circulatory action of the gases within the burner produces an unusually high capacity for the size of the burner and insures better mixing of the air and oil vapor with resultant cleaner and more efficient burning.

I claim:

1. In an oil burner, a container having bottom and side and top walls, means for admitting oil to said container, means for admitting air to said container, said top wall having a discharge opening centrally thereof, and a plurality of radially extending vanes mounted on the under side of said top wall and extending from adjacent said side wall to adjacent said opening for guiding the movement of air from said side wall to said opening.

2. In an oil burner, a container having bottom and side and top walls, means for admitting oil to said container for heating and vaporizing and mixture with air for burning, said top wall having a discharge opening centrally thereof, a plurality of vanes carried by said top wall and extending radially thereon with respect to said opening from adjacent the outer periphery of said top wall to adjacent said opening, said side wall having openings for admitting air to said container through said side wall adjacent the outer edges of said vanes.

3. In an oil burner, a container defined by a substantially cylindrical side wall and disc-like bottom and top walls, means for admitting oil to said container for vaporizing and mixing with air for burning, said top wall having a discharge opening centrally thereof, a plurality of vanes mounted on and depending from said top wall and extending from adjacent said opening to adjacent said side wall, said vanes being formed and mounted in substantially radial planes with respect to the longitudinal axis of said container and providing a plurality of inverted channels each increasing in width towards the radially outer end thereof, said side walls being formed with air openings providing the exclusive means of air entry to the container.

4. In an oil burner, a container having bottom and top and side walls, oil inlet means provided on said bottom wall substantially centrally thereof for admitting oil onto said bottom wall for vaporization and mixing with air for burning, said top wall having a discharge opening therein substantially centrally thereof, and a plurality of vanes mounted on and depending from said top wall and providing separate open-bottomed passages extending substantially radially with respect to said discharge opening from adjacent said opening to adjacent said side wall, said side wall being formed with a plurality of air inlet openings adjacent the top thereof and leading to said passages between said vanes for entry of air into said container horizontally across the underside of said top wall, said vanes functioning to guide said air radially inward in a plurality of independent streams.

5. In an oil burner, a container having bottom and side and top walls, means for admitting oil to said container, means for admitting air to said container, said top wall having a discharge opening centrally thereof and spaced from said side wall, a plurality of vanes attached in heat transfer relation to said top wall and depending therefrom in said container and extending from adjacent said opening to adjacent said side wall, and means cooperating with said top wall and defining an air passage at the outer side of said top wall from adjacent the outer periphery thereof to adjacent said opening, and heat radiating means attached to said top wall and mounted in said air passage.

6. In an oil burner, a container having a bottom and top and side walls, means for admitting oil to said container, means for admitting air to said container substantially exclusively adjacent said top wall, said top wall having a discharge opening substantially centrally thereof and spaced from said side wall, and means extending along the under side of said top wall providing separate passages for directing said air radially inwardly of said side wall toward said discharge opening.

7. An oil burner throat construction adapted for mounting, within a heater casing, for delivering an air and vapor mixture into said heater casing, comprising in combination with a casing and an oil vaporizing and air mixing chamber, a vertical annular wall having a lower end opening leading into the interior of said chamber and an upper end opening leading into said heater casing, a second vertical annular wall concentric with said first wall and defining therewith an annular air passage, said second wall extending higher than said first wall, and a plurality of opposed pairs of inwardly projecting coplanar portions extending from said second wall over the upper end of said first wall and the opening at such end, and spaced from said end a distance substantially corresponding to the spacing between said annular walls, the edges of adjacent projecting portions being parallel and defining branch passages from said first air passage to said heater casing.

8. In an oil burner, a container having bottom and side walls, an upper wall extending inwardly from said side wall and above said bottom wall to form an oil vaporization chamber, said upper wall having a discharge opening centrally thereof, said side wall having air admission openings adjacent the top wall and being substantially imperforate between said openings and the bottom wall, and means providing guiding passages for directing air from said openings inwardly along said top wall towards said discharge opening.

9. In an oil burner, a container having an oil vaporizing and air mixing chamber therein and provided with a discharge throat in an upper portion thereof, means for admitting oil to said container for ignition in said chamber, means for admitting primary air to said chamber for admixture with oil vapor therein to form a combustion mixture which may flow through said throat, means below the top of said throat for introducing secondary air to the combustion mixture flowing through said throat, and means at the top of said throat acting on said combustion mixture after the introduction of said secondary air thereto for effecting a radial concentration of said flow toward the axis thereof as it passes through said throat, said last means comprising circumferentially spaced portions directly over the throat at the periphery thereof, the combined effective transverse area of said portions being less than the total transverse area of the spaces between said portions.

10. In an oil burner, a container having an oil vaporizing and air mixing chamber therein and provided with a discharge throat at the upper portion thereof, means for admitting oil to said container for ignition in said combustion chamber, means for admitting primary air to said combustion chamber for admixture with oil vapor therein, said throat being of a form to cause the mixture to flow upwardly therein in a substantially cylindrical column from said chamber, means for introducing secondary air to the column below the top of the throat and inwardly-projecting substantially-coplanar members spaced immediately above said last means overlying the flow path of said column of combustible mixture for intercepting portions of said flow and for effecting a radial concentration of said flow toward the axis of the latter as the flow passes through said throat, the combined effective transverse area of said members being less than the total transverse area of the spaces between said members.

11. An oil burner throat construction adapted for mounting within a heater casing for delivering an air and vapor mixture into said heater casing, comprising, in combination with a casing and an oil vaporizing and air mixing chamber, a substantially vertical annular wall having a lower end opening leading into the interior of said chamber and an upper end opening extending toward said heater casing, a second substantially vertical annular wall concentric with said first wall and defining therewith an annular air passage, said second wall extending higher than the first wall, and a plurality of circumferentially-spaced inwardly projecting substantially coplanar portions extending from said second wall in spaced relation over the upper end of said first wall and the opening at such end, the edges of adjacent projecting portions defining branch passages from said first air passage to said heater casing, and the space between said edges adjacent the second wall being substantially no less than the width of the projections adjacent said wall.

HARRY C. LITTLE.

REFERENCES CITED

The following references are of record in the file of this patent:

UNITED STATES PATENTS

| Number | Name | Date |
|---|---|---|
| 1,897,314 | Little | Feb. 14, 1933 |
| 2,072,048 | Leonard | Feb. 23, 1937 |
| 2,074,087 | Huetteman et al. | Mar. 16, 1937 |
| 2,200,861 | Peoples | May 14, 1940 |
| 2,259,743 | Fletcher | Oct. 21, 1941 |
| 2,287,361 | Suchland | June 23, 1942 |
| 2,337,673 | McCurtain | Dec. 28, 1943 |